Feb. 24, 1959 F. M. FRAGA 2,874,975
ADJUSTABLE HITCH FOR OFFSET DISC PLOWS
Filed Jan. 20, 1958 3 Sheets-Sheet 1

INVENTOR.
Frank M. Fraga
BY
ATTYS

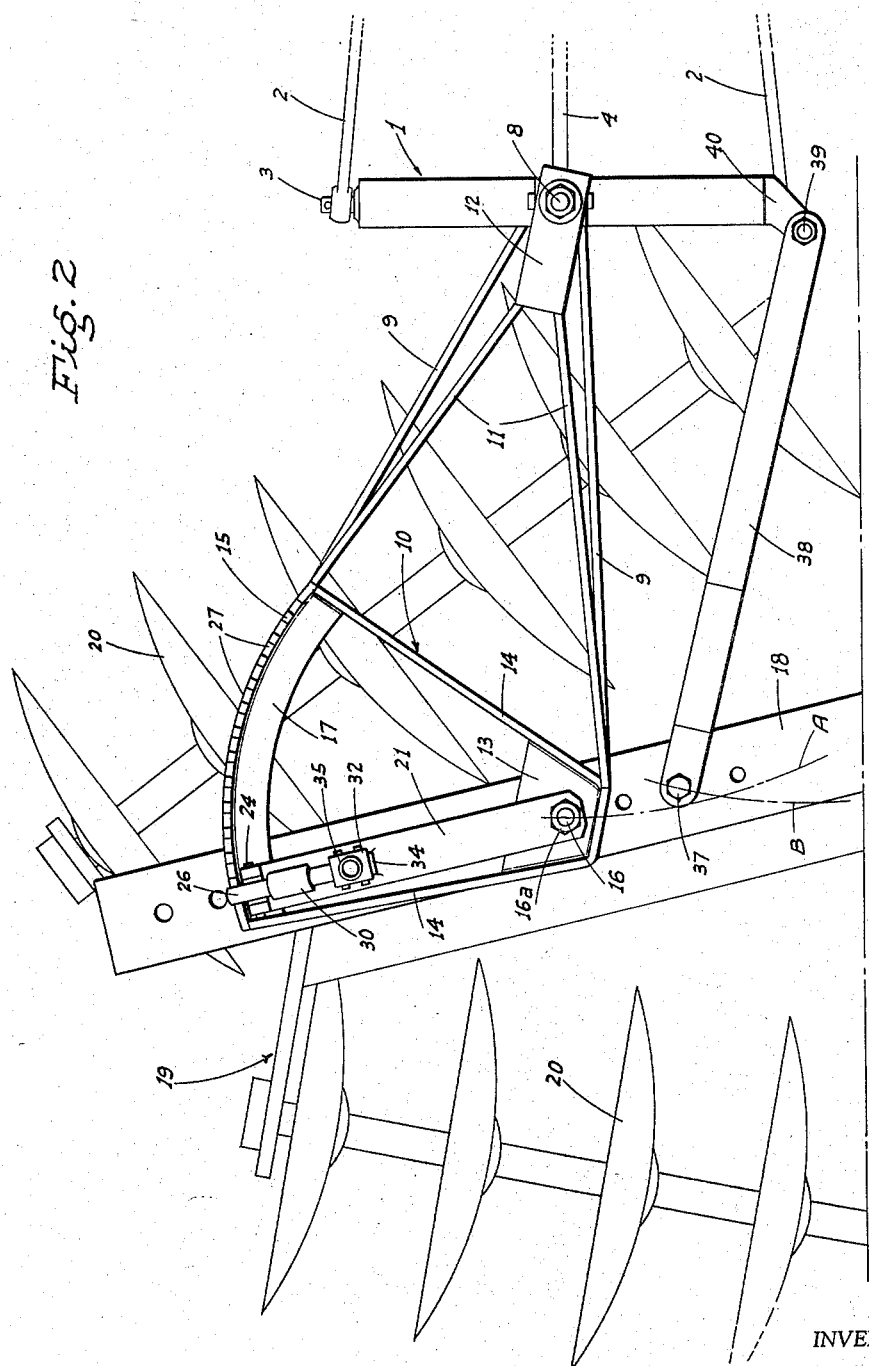

Feb. 24, 1959
F. M. FRAGA
2,874,975
ADJUSTABLE HITCH FOR OFFSET DISC PLOWS
Filed Jan. 20, 1958
3 Sheets-Sheet 3
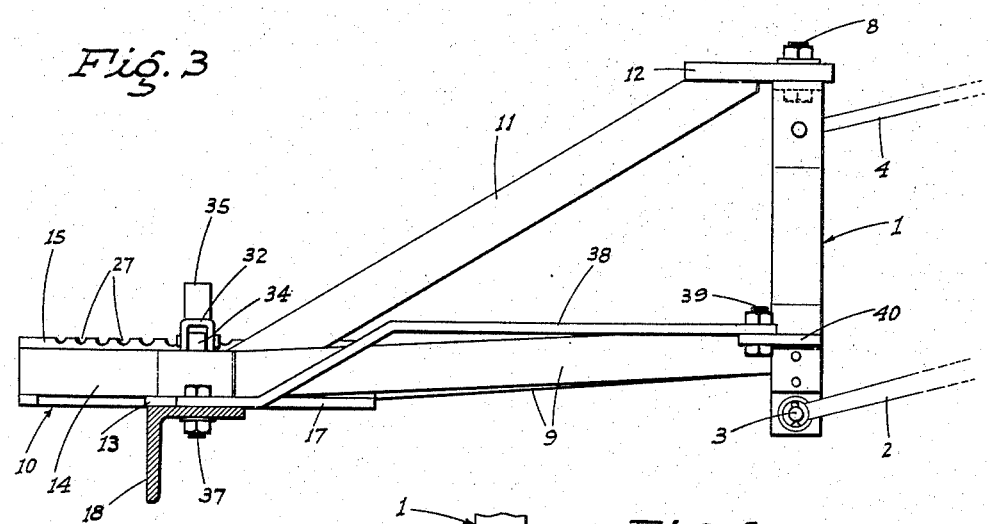
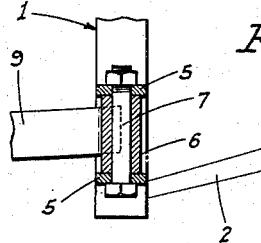
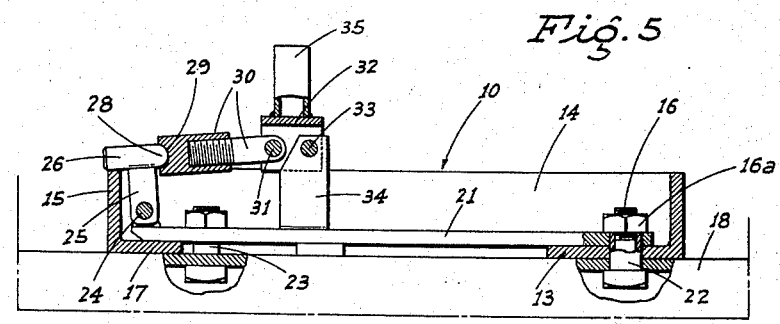
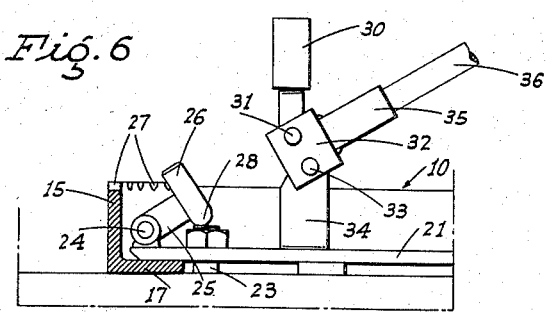
INVENTOR.
Frank M. Fraga
BY
ATTYS United States Patent Office 2,874,975
Patented Feb. 24, 1959

2,874,975

ADJUSTABLE HITCH FOR OFFSET DISC PLOWS

Frank M. Fraga, Fresno, Calif.

Application January 20, 1958, Serial No. 709,886

6 Claims. (Cl. 280—467)

This invention relates to tractor hitches for ground working implements, particularly disc gangs. It is desirable at times that the gangs shall be disposed in laterally offset relation on either side of the longitudinal central line of draft of the tractor, as well as being disposed in central alinement with the tractor.

The principal object of this invention is to provide a hitch structure for the purpose so constructed that when the gang is adjusted to one side or the other of the line of draft, the angle of the plows is automatically changed according to the extent of lateral adjustment of the gang without the operator having to guess the proper angle.

A further object of the invention is to provide a readily engaged or released lock structure for securing the gang to the hitch upon a lateral shift of the gang having been made.

Another object of the invention is to provide a practical, reliable, and durable adjustable hitch for offset disc plows, and one which will be exceedingly effective for the purpose for which it is designed.

An additional object of the invention is to provide an adjustable hitch for offset disc plows which is designed for ease and economy of manufacture.

These objects are accomplished by means of such structure and relative arrangement of parts as will fully appear by a perusal of the following specification and claims.

In the drawings:

Fig. 2 is a similar view showing the hitch and gang as shifted to the left of the line of draft.

Fig. 3 is a side elevation of the hitch structure as connected to the main transverse frame beam of a disc gang.

Fig. 4 is a fragmentary sectional elevation of the lower portion of the A-frame of the hitch, taken on line 4—4 of Fig. 1.

Fig. 5 is an enlarged fragmentary transverse sectional elevation on line 5—5 of Fig. 1.

Fig. 6 is a similar view, but showing the lock released.

Figure 1:
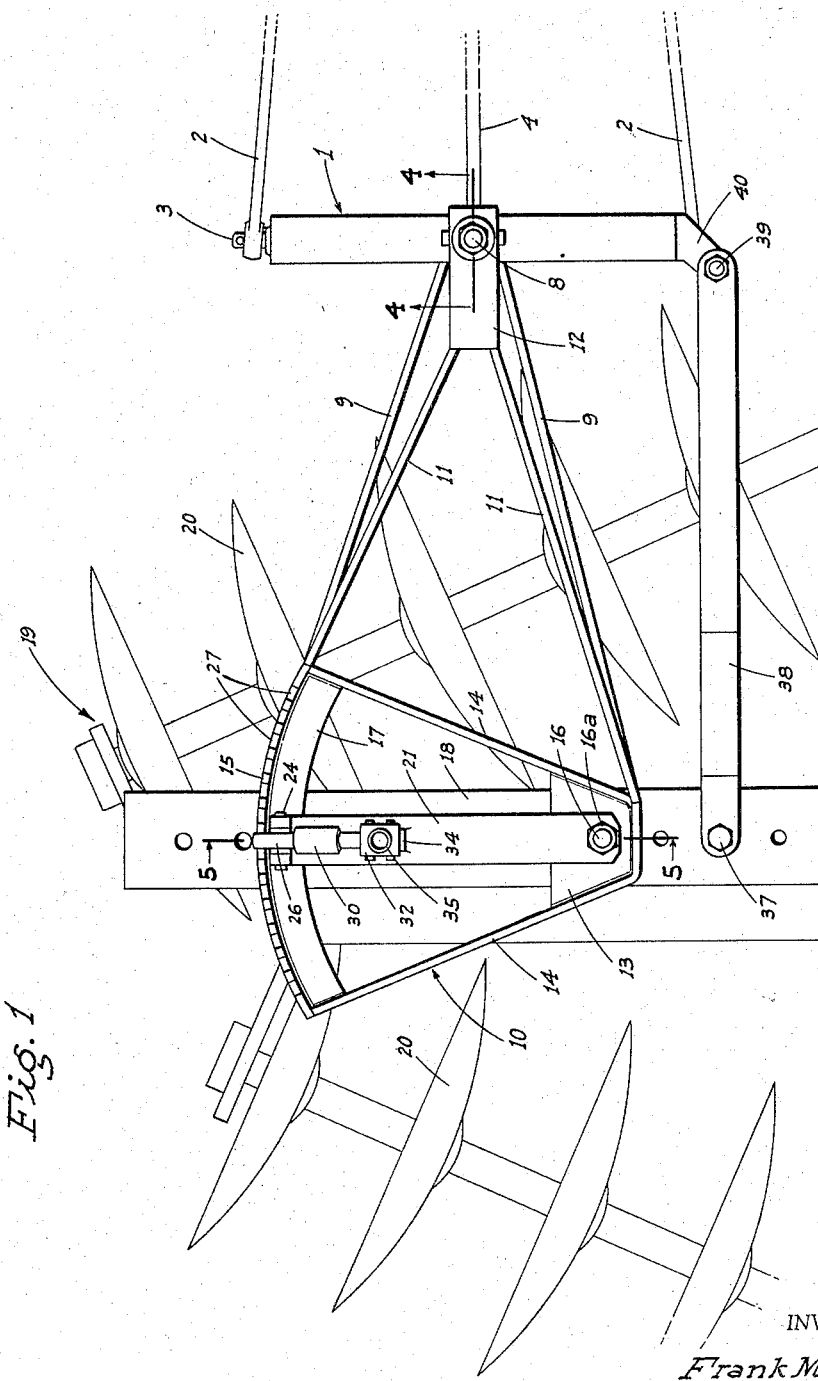
Fig. 1 is a top plan of the improved hitch structure as mounted in connection with a disc gang and in a central position relative to the line of draft.

Referring now more particularly to the drawings and to the characters of reference marked thereon, the hitch comprises an upstanding A-frame 1, of generally conventional form, as used in connection with tractors having an implement lift mechanism. The lower draft arms 2 of such mechanism are connected to laterally projecting pins 3 at the lower end of the A-frame, while the upper depth-control link 4 of the mechanism is connected to the A-frame adjacent its upper end, as usual.

The A-frame includes transverse, vertically spaced beams 5 between which a sleeve 6 is disposed; this sleeve being turnable on an upstanding pin 7 mounted in the beams 5 and axially alined with a pivot bolt or pin 8 mounted in the A-frame at the top thereof.

Substantially horizontal rigid arms 9 are secured on—and diverge rearwardly from—sleeve 6 to a rigid connection with a laterally projecting quadrant frame 10 on the forward side thereof. Other rigid arms 11 are connected at their forward end on a plate 12 supported on the top of the A-frame 1 and turnable on the pin 8. The arms 11 diverge and also slope down from the plate 12 to rigid connection with the arms 9 at their rear end. The quadrant frame 10 and arms 9 and 11 thus form a rigid draft unit, turnable horizontally relative to the A-frame 1 about pins 7 and 8 as an axis, but rigid with said A-frame for movement as a unit therewith in a vertical plane.

The quadrant frame 10 includes a platform 13 at one end, side bars 14 diverging from said end, and a notched quadrant bar 15 connecting the side bars at their diverged end and curved concentric with a heavy pivot bolt 16 projecting upwardly from platform 13. A base plate 17, level with platform 13 and curved concentric with the bar 15, projects inwardly of the frame 10 from said bar 15 and is rigid with the latter.

The platform 13 and base plate 17 of the quadrant frame 10 rest on the main transverse frame beam 18 of the disc gang unit 19, the discs 20 of which are set at an angle to the beam 18 and the line of draft of the implement, as usual.

The pivot bolt 16 connects the frame 10 to the beam 18, as shown in Fig. 5, and also independently forms the pivot for the base bar 21 of the locking structure; said bar 21 resting on the platform 13 and extending lengthwise of beam 18 to and resting on base plate 17.

In order to prevent binding of the bar 21 on the platform 13, and the latter on beam 18 when the bolt nut 16a is tightened down, the bolt under said nut is surrounded by a sleeve 22 on which the above named parts actually turn.

Adjacent the base plate 17 the bar 21 is releasably clamped to said plate, and also permanently held in alinement with beam 18, by a bolt 23 secured in said beam and projecting through the bar 21 clear of the plate 17, as shown in Figs. 5 and 6.

Transversely pivoted, as at 24, on the bar 21 adjacent the quadrant bar 15 is a normally upstanding lug 25 on the upper end of which a lock pin 26 is fixed. This pin extends in a radial direction relative to the pivot bolt 16, and is arranged to seat in any one of the notches 27 of the quadrant bar 15.

The end of the pin 26 opposite quadrant bar 15 is rounded, as at 28, and said rounded end—when the pin 26 is engaged with the quadrant bar 15—is engaged in a socket 29 formed in the adjacent end of a locking link 30. The opposite end of the link is pivoted, as at 31, in a saddle 32 which straddles, and is pivoted beyond, pivot 31, as at 33, in a post 34 rigid with and upstanding from the base bar 21. Rigid with and upstanding from the saddle 32 is a socket 35 adapted to be engaged by a lever, such as a rod 36 as indicated in Fig. 6.

With this arrangement it will be seen that the lock pin 26 may be retained in a quadrant engaging and locking position, after having been manually so engaged, by manipulation of the socket 29 of link 30 with the rounded end of the pin 28, accompanied by manipulation of the link and saddle by the lever pin 36. The quadrant frame 10—and the draft unit as a whole—may thus be releasably locked to the beam 18 and the disc gang unit of which beam 18 is a part.

Pivoted at its rear end on beam 18, as at 37, is a forwardly extending swing control bar 38; the pivot 37 being laterally out from the pivoted end of the quadrant frame 10. The bar 38, at its forward end, is pivoted, as at 39, on a bracket 40 secured on the A-frame 1 just above the lateral pin 3 on the corresponding side of the A-frame, as shown in Fig. 3.

The transverse distance between the pivots 8 and 39 is considerably greater than the corresponding distance between pivots 16 and 37. The length of bar 38 is such that when said bar is disposed parallel to the line of draft, the hitch structure and the plow unit connected thereto are centrally disposed relative to such line of draft. The pivot 16 is then disposed to one side of said line of draft, the plow beam 18 is parallel to the A-frame in the transverse plane thereof, and the lock pin 26 engages the quadrant bar 15 centrally of its length; all as shown in Fig. 1.

When the disc gang is to be adjusted to one side or the other of the line of draft, the lock pin 26 is released and thrown back from the quadrant bar 15, as shown in Fig. 2, and the clamping bolt 23 is loosened to free the base bar 21 from pressing engagement with the base plate 17 of the quadrant, and which plate is a rigid element of the hitch structure as a whole.

The gang 19 is then pulled to the desired side (after being lifted free of the ground by manipulation of the draft arms 2 in the usual manner).

As the gang 19 is thus pulled, the hitch structure of course assumes an angle relative to the line of draft, while the gang—including its transverse main beam 18—assumes an angle, in a horizontal plane, relative to the hitch structure, as shown in Fig. 2. This is because the rear end of the hitch structure, at pivot 16, moves through an arc A which is a different diameter than that of the arc B through which the rear-end pivot 37 of the bar 38 moves. The beam 18 is thus swung to a non-parallel position relative to the A-frame, and the discs connected to said beam assume a different angle to the line of draft than that initially had. In other words, as the gang is shifted laterally the discs are automatically shifted to a desirable angle which insures the proper operation of the discs and ease of manipulation of the tractor.

When the gang has been laterally adjusted to the desired extent the lock pin 26 is re-engaged with a notch 27 in the quadrant bar 15 and locked in its engaged position, and the clamping bolt 23 is tightened to clamp the bar 21 against the plate 17 so as to relieve the lock pin of some of the load. The gang 19 is thus held in its adjusted position, and cannot shift therefrom unless the lock pin is first released.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A hitch for a disc gang having a transverse frame beam comprising, with a tractor-connected frame, a rigid draft unit extending rearwardly from the frame and at its rear end overhanging said beam, means pivoting the draft unit at its forward end on the frame for swivel movement in a horizontal plane, a vertical pivot connection between the draft unit at its rear end and the transverse beam, means to releasably lock the draft unit to said beam against relative swinging movement, a rigid swing control bar extending from the frame to the transverse beam in laterally offset relation to the draft unit, a vertical pivot connection between the frame and said bar at the forward end of the latter and laterally offset from the pivot connection of said draft unit with the frame, and a vertical pivot connection between the rear end of the bar and the beam in laterally offset relation to the pivot connection of the draft unit therewith a distance less than the lateral offset of the forward end of the bar from the adjacent pivot connection of the draft unit.

2. A hitch, as in claim 1, in which the pivot means between the frame and the draft unit is arranged to maintain said frame and draft unit against relative movement in a vertical plane.

3. A hitch for a disc gang having a transverse frame beam comprising, with a tractor-connected frame, a rigid draft unit extending rearwardly from the frame and at its rear end overhanging said beam, means pivoting the draft unit at its forward end on the frame for swivel movement in a horizontal plane, a vertical pivot connection between the draft unit at its rear end and the transverse beam, means to releasably lock the draft unit to said beam against relative swinging movement, a rigid swing control bar extending from the frame to the transverse beam in laterally offset relation to the draft unit, a vertical pivot connection between the frame and said bar at the forward end of the latter and laterally offset from the pivot connection of said draft unit with the frame, and a vertical pivot connection between the rear end of the bar and the beam in laterally offset relation to the pivot connection of the draft unit therewith a distance less than the lateral offset of the forward end of the bar from the adjacent pivot connection of the draft unit; the lock means comprising a longitudinally notched quadrant bar formed with the draft unit concentric with the vertical pivot connection of said unit with the beam and extending across the beam, a base bar mounted on the beam and extending radially of the quadrant bar, a lock pin swivelly mounted on the base bar in position to engage a notch in the quadrant bar, and means on the base bar releasably engageable with the pin to maintain the same in a quadrant engaging position.

4. A hitch, as in claim 3, with a base plate formed on the draft unit and extending along the quadrant bar concentric therewith and resting on the beam, said base bar at one end overlapping said plate, and a clamping bolt connecting the base bar and the beam adjacent the plate.

5. A hitch for a disc gang having a transverse frame beam comprising, with a tractor-connected frame, a rigid draft unit extending rearwardly from the frame and overhanging said beam, means pivoting the draft unit at its forward end on the frame for swivel movement in a horizontal plane, a vertical pivot connection between the draft unit at its rear end and the transverse beam, means to releasably lock the draft unit to said beam against relative swinging movement, and means separately connecting the frame and transverse beam and arranged in such cooperating relationship to the draft unit so that upon a lateral shifting of the gang relative to the frame about the pivot means of the draft unit as an axis, the angle of the transverse beam relative to the line of draft will be automatically altered to a fixed extent.

6. A structure, as in claim 1, in which the tractor-connected frame is an upstanding A-frame and the draft unit comprises a transversely extending rear end member adjustably secured to the beam, substantially horizontal side arms rigid with the member adjacent the side edges thereof and extending forwardly to adjacent the A-frame in converging relation to each other, a vertical sleeve rigid with the arms at their forward end, a pivot pin secured in the A-frame adjacent the lower end thereof and engaging the sleeve in relatively turnable relation, other side arms rigid with the first named arms at their rear end and diverging forwardly relative thereto in laterally converging relation to a point adjacent the A-frame at its upper end, a forwardly projecting horizontal plate rigidly connecting said other arms at their forward end, and means vertically pivoting the plate on the A-frame in axial alinement with the pin.

References Cited in the file of this patent

UNITED STATES PATENTS

| | | |
|---|---|---|
| 1,170,100 | Pearson | Feb. 1, 1916 |
| 2,597,121 | McKay et al. | May 20, 1952 |